(12) United States Patent
Yamamoto et al.

(10) Patent No.: US 6,732,607 B2
(45) Date of Patent: May 11, 2004

(54) GEAR CHANGE DEVICE

(75) Inventors: Yasushi Yamamoto, Kanagawa (JP); Nobuyuki Iwao, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 63 days.

(21) Appl. No.: 10/217,431

(22) Filed: Aug. 14, 2002

(65) Prior Publication Data

US 2003/0061895 A1 Apr. 3, 2003

(30) Foreign Application Priority Data

Sep. 28, 2001 (JP) ........................................ 2001-300831

(51) Int. Cl.[7] ............................................... F16H 61/04
(52) U.S. Cl. ............................... 74/473.12; 74/473.36; 335/266
(58) Field of Search ........................ 74/473.12, 473.36; 335/266

(56) References Cited

U.S. PATENT DOCUMENTS

| | | |
|---|---|---|
| 4,567,969 A | 2/1986 | Makita |
| 4,860,792 A | 8/1989 | Ichihashi et al. |
| 5,191,804 A | 3/1993 | Genise |
| 5,241,292 A | 8/1993 | Bjorknas et al. |
| 5,471,893 A | 12/1995 | Newbigging |
| 5,689,997 A | 11/1997 | Schaller |
| 5,743,143 A | 4/1998 | Carpenter et al. |
| 6,382,042 B1 | 5/2002 | Bovina et al. |
| 2003/0074998 A1 | 4/2003 | Esly et al. |

OTHER PUBLICATIONS

Bruno Lequesne; "Fast–Acting Long–Stroke Bistable Solenoids with Moving Permanent Magnets"; IEEE Transactions on Industry Applications, vol. 26, No. 3 May/Jun. 1990.

*Primary Examiner*—William C. Joyce (57) ABSTRACT

A gear change device comprises a select actuator for operating the shift lever of a transmission in the direction of selection and a shift actuator for operating the shift lever in the direction of shift. The select actuator has a casing, a shift lever support member that is arranged in the casing so as to slide in the axial direction and supports the shift lever, a magnetic moving means arranged on the outer periphery of the shift lever support member, a cylindrical fixed yoke arranged surrounding the magnetic moving means, a pair of coils arranged inside the fixed yoke, and a select position-limiting means for limiting the operation position of the shift lever support member according to a thrust produced by the shift lever support member in proportion to the amount of electric power fed to the pair of coils, and further, magnetic members are arranged on both sides of the pair of coils.

2 Claims, 7 Drawing Sheets

GEAR CHANGE DEVICE

FIELD OF THE INVENTION

The present invention relates to a gear change device for shifting a transmission mounted on a vehicle.

DESCRIPTION OF RELATED ART

A gear change device for shifting a transmission comprises a select actuator for actuating a shift lever in a direction of selection and a shift actuator for actuating the shift lever in a direction of shift.

As the select actuator and the shift actuator, there are generally used fluid pressure cylinders by using a fluid pressure such as air pressure or hydraulic pressure as a source of operation. The select actuator and shift actuator employing the fluid cylinders require piping for connecting the source of fluid pressure to each of the actuators, require electromagnetic change-over valves for changing over the flow passage of the operation fluid, and require space for arranging the above components, resulting in an increase in weight of the device as a whole.

In recent years, there have been proposed a select actuator and a shift actuator constituted by electric motors as a gear change device for shifting a transmission mounted on a vehicle which is provided with neither a source of compressed air nor a source of hydraulic pressure. The select actuator and the shift actuator constituted by electric motors can be constructed in a compact size as a whole and in a reduced weight since they need neither the piping for connection to the source of hydraulic pressure nor the electromagnetic change-over valve, unlike the actuators that use fluid pressure cylinders. The actuators using electric motors, however, require a speed reduction mechanism for obtaining a predetermined operation force. As the speed reduction mechanisms, there have been proposed the one using a ball-screw mechanism and the one using a gear mechanism. However, the actuators using the ball-screw mechanism and the gear mechanism are not necessarily satisfactory in regard to durability of the ball screw mechanism and of the gear mechanism and in regard to durability and the operation speed of the electric motors.

The present applicant, therefore, has proposed a gear change device equipped with a select actuator that is excellent in durability and has a high operation speed as Japanese Patent Application No. 2001-013162. In this gear change device, the select actuator is constituted by a casing, a control shaft that is rotatably arranged in the casing and is caused to turn by the shift actuator in the direction of shift, a cylindrical shift sleeve that is arranged on the control shaft so as to slide in the axial direction and is constituted integratedly with a shift lever so as to work as a shift lever support member, a magnetic moving means arranged on the outer peripheral surface of the shift sleeve, a cylindrical fixed yoke arranged surrounding the magnetic moving means, and a pair of coils arranged inside the fixed yoke.

However, the select actuator must reliably bring the shift lever to a predetermined select position. Therefore, the select actuator in the gear change device is provided with a select position-limiting means for limiting the operation position of the shift sleeve according to the thrust that generates in the shift sleeve as the shift lever support member, in proportion of the amount of electric power fed to the pair of coils. However, the select position-limiting means utilizes a spring force which increases as the shift lever moves in the direction of selection. Therefore, the select actuator produces no sufficient driving force near the select stroke end and often fails to work. To avoid this, the electric power of an increased amount must be supplied to the pair of coils, resulting in a loss of electric power.

SUMMARY OF THE INVENTION

It is, therefore, an object of the present invention to provide a gear change device equipped with a select actuator which is capable of adding a driving force near the select stroke end.

In order to accomplish the above-mentioned object according to the present invention, there is provided a gear change device comprising:

a select actuator for operating the shift lever of a transmission in the direction of selection; and a shift actuator for operating said shift lever in the direction of shift; wherein said select actuator has a casing, a shift lever support member that is arranged in said casing so as to slide in the axial direction and supports said shift lever, a magnetic moving means arranged on the outer periphery of said shift lever support member, a cylindrical fixed yoke arranged surrounding said magnetic moving means, a pair of coils arranged inside said fixed yoke, and a select position-limiting means for limiting the operation position of said shift lever support member according to a thrust produced by said shift lever support member in proportion to the amount of electric power fed to said pair of coils; and further, magnetic members are arranged on both sides of said pair of coils.

The magnetic members are arranged in a bobbin on which the pair of coils are wound.

DETAILED DESCRIPTION OF THE PREFERRED EMBODIMENTS

The gear change device constituted according to the present invention will now be described in further detail with reference to the accompanying drawings illustrating preferred embodiments of the invention.

Figure 1:
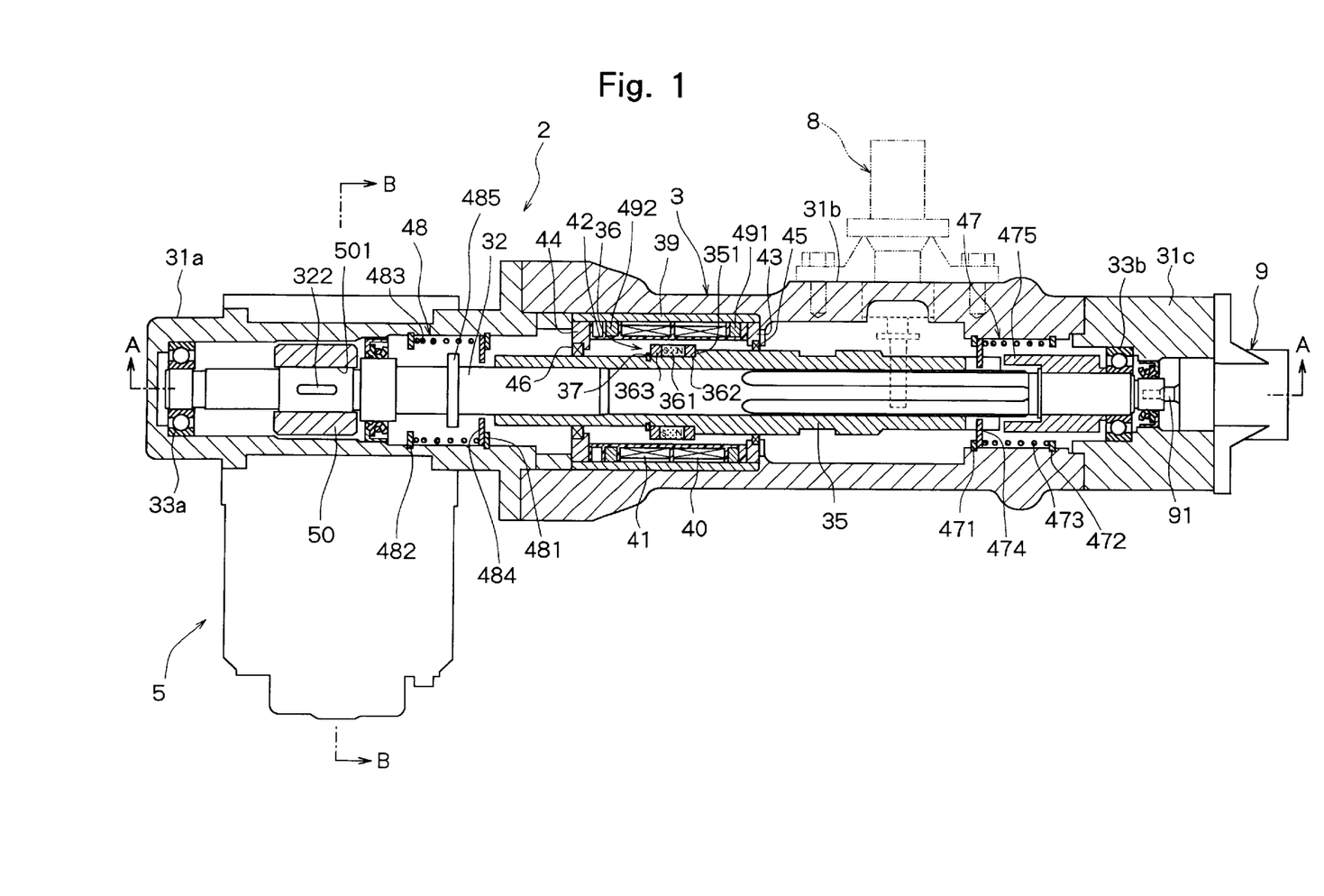
FIG. 1 is a sectional view illustrating a gear change device constituted according to the present invention.
Figure 2:
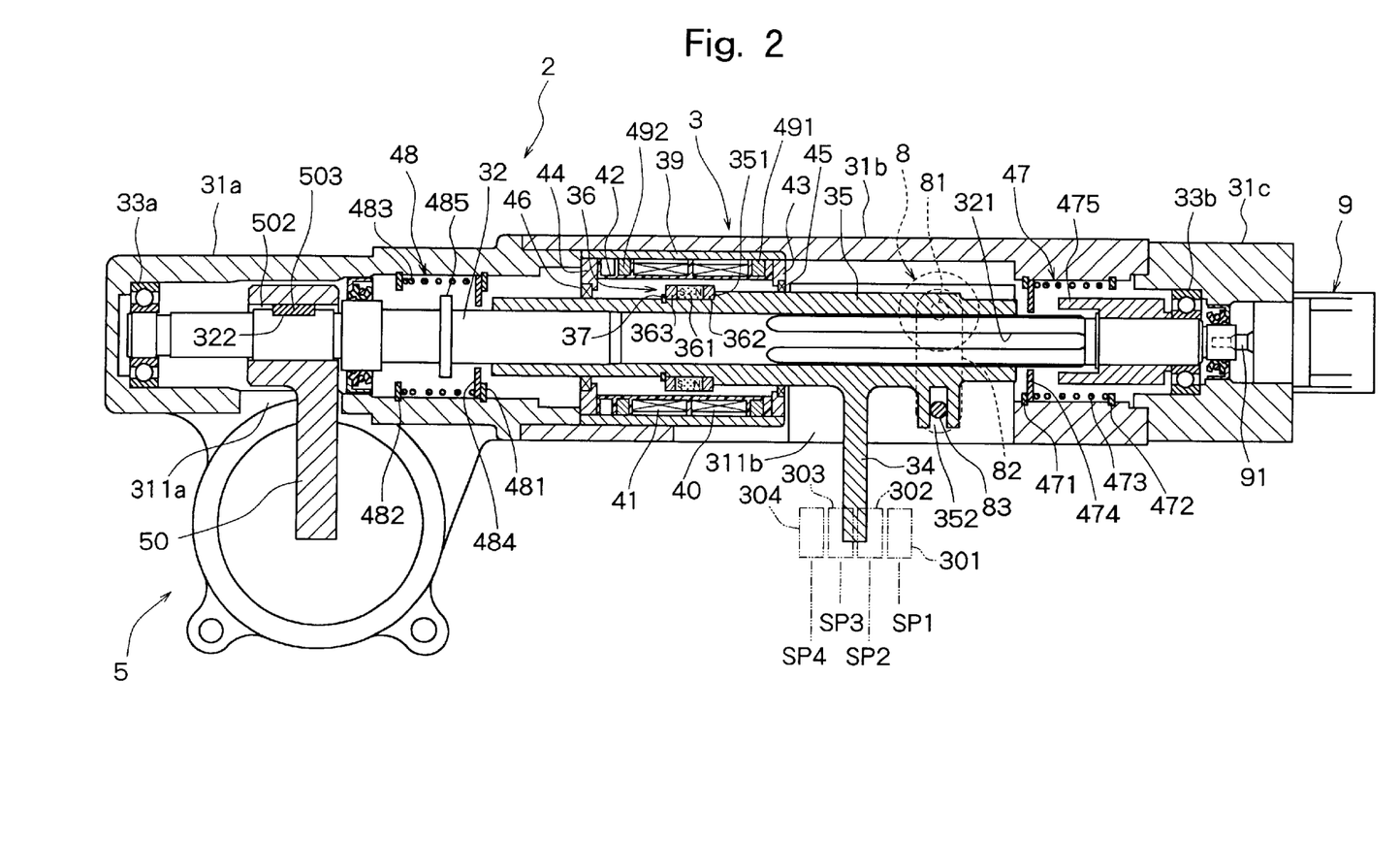
FIG. 2 is a sectional view along the line A—A in FIG. 1.

FIG. 1 is a sectional view illustrating the gear change device constituted according to the present invention, and FIG. 2 is a sectional view along the line A—A in FIG. 1.

The gear change device 2 according to the illustrated embodiment is constituted by a select actuator 3 and a shift actuator 5. The select actuator 3 has three casings 31a, 31b and 31c formed in a cylindrical shape. A control shaft 32 is arranged in the three casings 31a, 31b and 31c. Both ends of the control shaft 32 are rotatably supported by the casings 31a and 31c on both sides through bearings 33a and 33b. The control shaft 32 has a spline 321 formed in the middle portion thereof. To the spline 321 is spline-fitted a cylindrical shift sleeve 35 which is integratedly constituted with a shift lever 34 so as to slide in the axial direction. Therefore, the shift sleeve 35 is arranged in the casing so as to slide in the axial direction, and works as a shift lever support member for supporting the shift lever. The shift lever 34 and the shift sleeve 35 are made of a nonmagnetic material such as a stainless steel or the like, the shift lever 34 being arranged passing through an opening 311b formed in the lower portion of the central casing 31b. An end of the shift lever 34 is so constituted as to come into suitable engagement with the shift blocks 301, 302, 303 and 304 that are arranged at the first select position SP1, at the second select position SP2, at the third select position SP3 and at a fourth select position SP4 and constitute a shift mechanism of a transmission that is not shown.

A magnetic moving means 36 is arranged on the outer peripheral surface of the shift sleeve 35. The magnetic moving means 36 is constituted by an annular permanent magnet 361 mounted on the outer peripheral surface of the shift sleeve 35 and having magnetic poles in both end surfaces in the axial direction and by a pair of moving yokes 362 and 363 arranged on the outer sides of the permanent magnet 361 in the axial direction. In the illustrated embodiment, the permanent magnet 361 is magnetized into the N-pole in the right end surfaces in FIGS. 1 and 2, and is magnetized into the S-pole in the left end surface in FIGS. 1 and 2. The pair of moving yokes 362 and 363 are formed in an annular shape by using a magnetic material. The thus constituted magnetic moving means 36 is positioned at its right end in FIGS. 1 and 2 of one moving yoke 362 (right side in FIGS. 1 and 2) by a stepped portion 351 formed in the shift sleeve 35, and is positioned at its left end in FIGS. 1 and 2 of the other moving yoke 363 (left side in FIGS. 1 and 2) by a snap ring 37 fitted to the shift sleeve 35, so that the motion in the axial direction is limited. A fixed yoke 39 is arranged on the outer peripheral side of the magnetic moving means 36 to surround the magnetic moving means 36. The fixed yoke 39 is formed in a cylindrical shape by using a magnetic material and is mounted on the inner peripheral surface of the central casing 31b. A pair of coils 40 and 41 are arranged inside the fixed yoke 39. The pair of coils 40 and 41 are wound on a bobbin 42 that is made of a nonmagnetic material such as a synthetic resin or the like and is mounted along the inner peripheral surface of the fixed yoke 39. In the illustrated embodiment, magnetic members 491 and 492 are arranged in the bobbin 42 on both sides of the pair of coils 40 and 41. The magnetic members 491 and 492 are formed in an annular shape by using a magnetic material such as iron or the like. The pair of coils 40 and 41 are connected to a power source circuit that is not shown. The length of the coil 40 in the axial direction is set to be a length nearly corresponding to the length of selection from the first select position SP1 up to the fourth select position SP4. End walls 43 and 44 made of a nonmagnetic material are mounted on both sides of the fixed yoke 39. Sealing members 45 and 46 which come in contact with the outer peripheral surfaces of the shift sleeve 35 are mounted on the inner peripheries of the end walls 43 and 44.

The select actuator 3 is constituted as described above and operates based on the principle of a linear motor constituted by the magnetic moving means 36 arranged on the shift sleeve 35, the fixed yoke 39 and the pair of coils 40 and 41. The operation will now be described with reference to FIG. 3.

Figure 3:
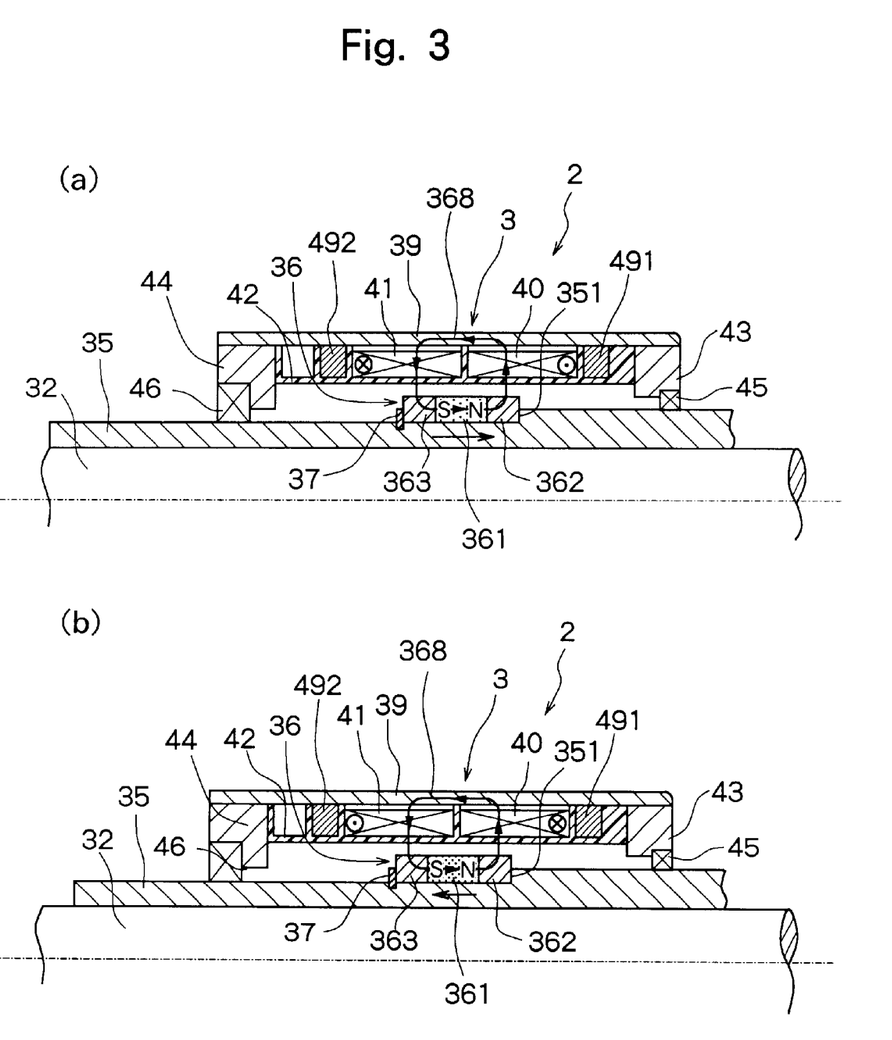
FIG. 3 is an explanatory view illustrating the operation of a select actuator that constitutes the gear change device shown in FIG. 1.

In the select actuator 3 of the first embodiment, there is established a magnetic circuit 368 passing through the N-pole of the permanent magnet 361, one moving yoke 362, one coil 40, the fixed yoke 39, the other coil 41, the other moving yoke 363 and S-pole of the permanent magnet 361, as shown in FIGS. 3(a) and 3(b). In this state, when electric currents are fed to the respective pair of coils 40 and 41 in the opposite directions as shown in FIG. 3(a), the permanent magnet 361, i.e., the shift sleeve 35 produces a rightward thrust, as indicated by an arrow in FIG. 3(a) according to the Fleming's left-hand rule. As shown in FIG. 3(b), on the other hand, when the electric currents are fed to the pair of coils 40 and 41 in the opposite directions opposite to those of FIG. 3(a), the permanent magnet 361, i.e., the shift sleeve 35 produces a leftward thrust as indicated by an arrow in FIG. 3(b) according to the Fleming's left-hand rule. The magnitude of thrust produced by the magnetic moving means 36, i.e., the shift sleeve 35 is determined by the amount of electric power fed to the pair of coils 40 and 41.

The select actuator 3 of the illustrated embodiment has the first select position-limiting means 47 and the second select position-limiting means 48 for limiting the position of the shift lever 34 to the first select position SP1, to the second select position SP2, to the third select position SP3 or to the fourth select position SP4 in cooperation with the magnitude of thrust acting on the magnetic moving means 36, i.e., on the shift sleeve 35. The first select position-limiting means 47 comprises snap rings 471 and 472 mounted on the central casing 31b at the right end portion in FIGS. 1 and 2 at a predetermined distance, a compression coil spring 473 arranged between the snap rings 471 and 472, a moving ring 474 arranged between the compression coil spring 473 and one snap ring 471, and a stopper 475 which limits the motion of the moving ring 474 by coming in contact therewith when the moving ring 474 has moved toward the right by a predetermined amount in FIGS. 1 and 2.

In the first select position-limiting means 47 constituted as described above, when a current of a voltage of, for example, 2.4 V is fed, as shown in FIG. 3(a), to the pair of coils 40 and 41 in a state shown in FIGS. 1 and 2, the magnetic moving means 36, i.e., the shift sleeve 35 moves toward the right in FIGS. 1 and 2, whereby the right end of the shift sleeve 35 comes in contact with the moving ring 474 in FIGS. 1 and 2 and is limited for its position. In this state, the resilient force of the coil spring 473 has been so set as to become larger than the thrust acting on the magnetic moving means 36, i.e., on the shift sleeve 35 and hence, the shift sleeve 35 that has come in contact with the moving ring 474 is brought to a halt at a position at which the moving ring 474 is in contact with one snap ring 471. In this case, the shift lever 34 constituted integratedly with the shift sleeve 35 is brought to the second select position SP2. Next, when a current of a voltage of, for example, 4.8 V is fed to the pair of coils 40 and 41 as shown in FIG. 3(a), the thrust acting on the yoke 36, i.e., on the shift sleeve 35 becomes larger than the resilient force of the coil spring 473. Hence, the shift sleeve 35 comes in contact with the moving ring 474 and, then, moves toward the right in FIGS. 1 and 2 against the resilient force of the coil spring 473, and is brought to a halt at a position at which the moving ring 474 is in contact with the stopper 475. At this moment, the shift lever 34 constituted integratedly with the shift sleeve 35 is brought to the first select position SP1.

Next, the second select position-limiting means 48 will be described.

The second select position-limiting means 48 comprises snap rings 481 and 482 mounted on the central casing 31b at the left end in FIGS. 1 and 2 at a predetermined distance, a coil spring 483 arranged between the snap rings 481 and 482, a moving ring 484 arranged between the coil spring 483 and one snap ring 481, and a stopper 485 which limits the motion of the moving ring 484 by coming in contact therewith when the moving ring 484 has moved toward the left by a predetermined amount in FIGS. 1 and 2.

In the second select position-limiting means 48 constituted as described above, when a current of a voltage of, for example, 2.4 V is fed, as shown in FIG. 3(b), to the pair of coils 40 and 41 in a state shown in FIGS. 1 and 2, the magnetic moving means 36, i.e., the shift sleeve 35 moves toward the left in FIGS. 1 and 2, whereby the left end of the shift sleeve 35 comes in contact with the moving ring 484 in FIGS. 1 and 2 and is limited for its position. In this state, the resilient force of the coil spring 483 has been so set as to become larger than the thrust acting on the permanent magnet 361, i.e., on the shift sleeve 35 and hence, the shift sleeve 35 that has come in contact with the moving ring 484 is brought to a halt at a position at which the moving ring 484 is in contact with one snap ring 481. In this case, the shift lever 34 constituted integratedly with the shift sleeve 35 is brought to the third select position SP3. Next, when a current of a voltage of, for example, 4.8 V is fed to the pair of coils 40 and 41 as shown in FIG. 3(b), the thrust acting on the magnetic moving means 36, i.e., on the shift sleeve 35 becomes larger than the resilient force of the coil spring 483. Hence, the shift sleeve 35 comes in contact with the moving ring 484 and, then, moves toward the left in FIGS. 1 and 2 against the resilient force of the coil spring 483, and is brought to a halt at a position at which the moving ring 484 is in contact with the stopper 485. At this moment, the shift lever 34 constituted integratedly with the shift sleeve 35 is brought to the fourth select position SP4.

As described above, the illustrated embodiment is provided with the first select position-limiting means 47 and the second select position-limiting means 48. By controlling the amount of electric power fed to the pair of coils 40 and 41, therefore, the shift lever 34 can be brought to a desired select position without the need of controlling the position.

Here, the driving force of the select actuator 3 will be described with reference to FIG. 4.

Figure 4:
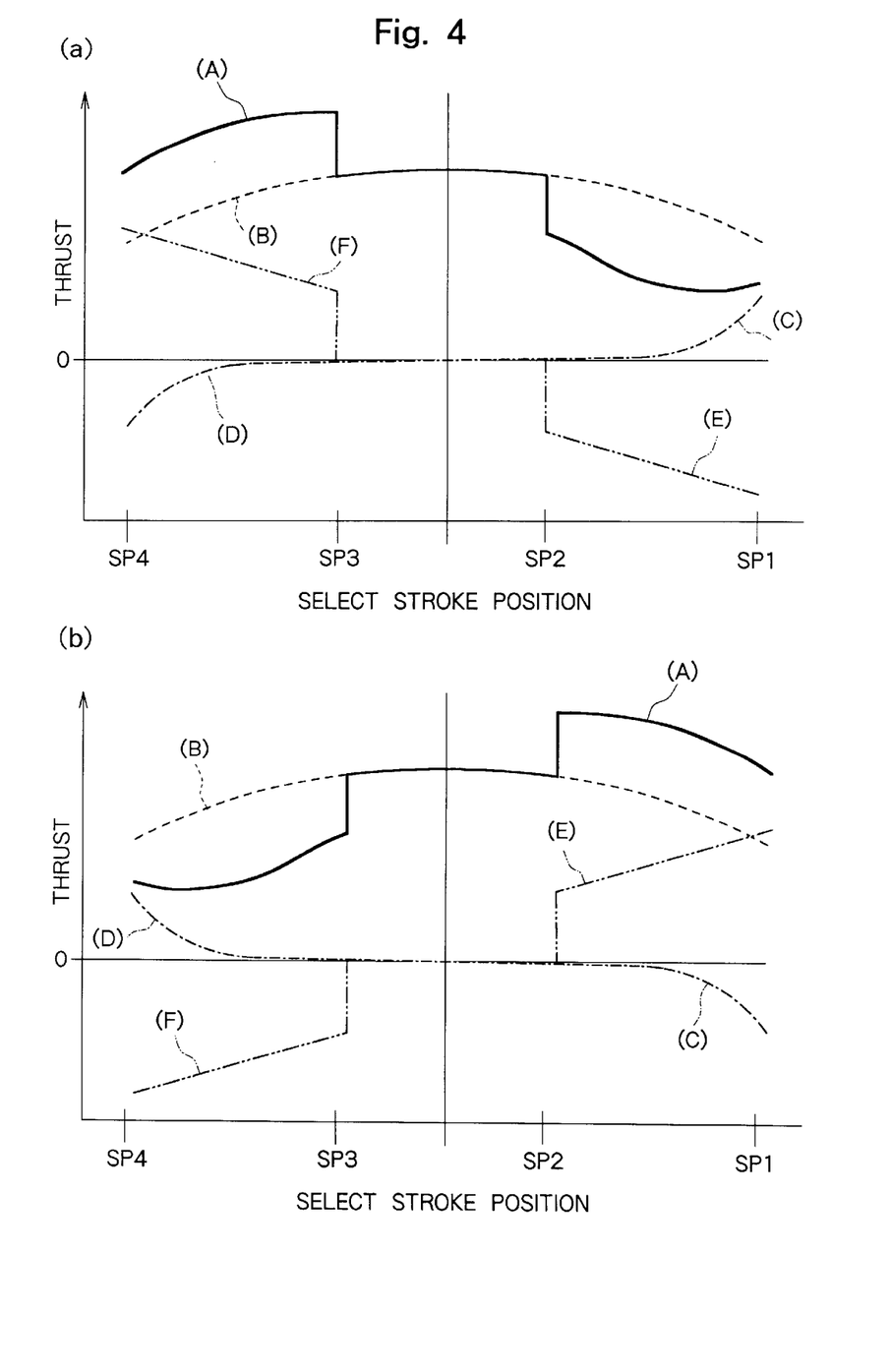
FIG. 4 is explanatory diagrams illustrating the driving force of the select actuator that constitutes the gear change device shown in FIG. 1.

FIG. 4(a) illustrates the driving force of the select actuator 3 of when the magnetic moving means 36, i.e., the shift sleeve 35 is operated toward the right, and FIG. 4(b) illustrates the driving force of the select actuator 3 of when the magnetic moving means 36, i.e., the shift sleeve 35 is operated toward the left. In FIGS. 4(a) and 4(b), broken lines (B) represent thrust characteristics based on the principle of a linear motor constituted by the magnetic moving means 36, the fixed yoke 39 and the pair of coils 40 and 41, chain lines (C) represent attractive forces between the permanent magnet 361 and the magnetic member 491, chain lines (D) represent attractive forces between the permanent magnet 361 and the magnetic member 492, two-dot chain lines (E) represent thrust characteristics of the coil spring 473 of the first select position-limiting means 47, two-dot chain lines (F) represent thrust characteristics of the coil spring 483 of the second select position-limiting means 48, and solid lines (A) represent driving forces of the select actuator 3 of when an electric current is fed to the pair of coils 40 and 41. That is, the driving force of the select actuator 3 of when an electric current is fed to the pair of coils 40 and 41 represented by the solid line (A) is a synthesis of the thrust represented by the broken line (B) produced based on the principle of the linear motor constituted by the magnetic moving means 36, the fixed yoke 39 and the pair of coils 40 and 41, attractive forces represented by the chain lines (C) and (D) between the permanent magnet 361 and the magnetic members 491, 492, and the thrusts of the coil springs 473 and 483 represented by the two-dot chain lines (E) and (F). In FIGS. 4(a) and 4(b), the thrust characteristics represented by the broken lines (B) based on the principle of the linear motor constituted by the magnetic moving means 36, the fixed yoke 39 and the pair of coils 40 and 41 are those of when a voltage of, for example, 4.8 V is applied to the pair of coils 40 and 41. The thrust of when a voltage of, for example, 2.4 V is applied to the pair of coils 40 and 41 is set to be smaller than the thrusts of the coil spring 473 of the first select position-limiting means 47 and of the coil spring 483 of the second select position-limiting means 48 at the second select position SP2 and at the third select position SP3.

When the magnetic moving means 36, i.e., the shift sleeve 35 is moved toward the right as shown in FIG. 4(a), the attractive force between the permanent magnet 361 and the magnetic member 492 acts as a negative (–) force as represented by the chain line (D), and the attractive force between the permanent magnet 361 and the magnetic member 491 acts as a positive (+) force as represented by the chain line (C). On the other hand, when the magnetic moving means 36, i.e., the shift sleeve 35 is moved toward the right, the thrust of the coil spring 483 of the second select position-limiting means 48 acts as a positive (+) force as represented by the two-dot chain line (F), and the thrust of the coil spring 473 of the first select position-limiting means 47 acts as a negative (–) force as represented by the two-dot chain line (E). From the fourth select position SP4 up to the third select position SP3, therefore, the thrust of the coil spring 483 of the second select position-limiting means 48 acts as the positive (+) force, and the select actuator 3 produces a sufficiently large driving force. From the fourth select position SP4 up to the second select position SP2, there exists no problem even when the voltage applied to the pair of coils 40 and 41 is, for example, 2.4 V. From the second select position SP2 toward the first select position SP1, on the other hand, the thrust of the coil spring 473 of the first select position-limiting means 47 represented by the two-dot chain line (E) acts as a negative (–) force. Near the first select position SP1, i.e., near the select stroke end, therefore, a sufficiently large driving force is not obtained by only the thrust represented by the broken line (B) which is based on the principle of the linear motor constituted by the magnetic moving means 36, the fixed yoke 39 and the pair of coils 40 and 41. In the illustrated embodiment, however, the attractive force between the permanent magnet 361 and the magnetic member 491 acts as a positive (+) force as represented by the chain line (C) near the first select position SP1, i.e., near the select stroke end. When the magnetic moving means 36, i.e., the shift sleeve 35 is moved toward the right as shown in FIG. 4(a), therefore, the select actuator 3 has a driving force (A) which is large enough even at the first select position SP1 which is the select stroke end.

Next, described below with reference to FIG. 4(b) is a case where the magnetic moving means 36, i.e., the shift sleeve 35 is moved toward the left.

When the magnetic moving means 36, i.e., the shift sleeve 35 is moved toward the left as shown in FIG. 4(b), the attractive force between the permanent magnet 361 and the magnetic member 491 acts as a negative (–) force as represented by the chain line (C), and the attractive force between the permanent magnet 361 and the magnetic member 492 acts as a positive (+) force as represented by the chain line (D). On the other hand, when the magnetic moving means 36, i.e., the shift sleeve 35 is moved toward the left, the thrust of the coil spring 473 of the first select position-limiting means 47 acts as a positive (+) force as represented by the two-dot chain line (E), and the thrust of the coil spring 483 of the second select position-limiting means 48 acts as a negative (−) force as represented by the two-dot chain line (F). From the first select position SP1 up to the second select position SP2, therefore, the thrust of the coil spring 473 of the first select position-limiting means 47 acts as the positive (+) force, and the select actuator 3 produces a sufficiently large driving force. From the first select position SP1 up to the third select position SP3, there exists no problem even when the voltage applied to the pair of coils 40 and 41 is, for example, 2.4 V. From the third select position SP3 toward the fourth select position SP4, on the other hand, the thrust of the coil spring 483 of the second select position-limiting means 48 represented by the two-dot chain line (F) acts as a negative (−) force. Near the fourth select position SP4, i.e., near the select stroke end, therefore, a sufficiently large driving force is not obtained by only the thrust represented by the broken line (B) which is based on the principle of the linear motor constituted by the magnetic moving means 36, the fixed yoke 39 and the pair of coils 40 and 41. In the illustrated embodiment, however, the attractive force between the permanent magnet 361 and the magnetic member 491 acts as a positive (+) force as represented by the chain line (D) near the fourth select position SP4, i.e., near the select stroke end. When the magnetic moving means 36, i.e., the shift sleeve 35 is moved toward the left as shown in FIG. 4(b), therefore, the select actuator 3 has a driving force (A) which is large enough even at the fourth select position SP4 which is the select stroke end.

Reverting to FIGS. 1 and 2, the gear change device according to the illustrated embodiment has a select position sensor 8 for detecting the position of the shift sleeve 35 integratedly constituted with the shift lever 34, i.e., for detecting the position thereof in the direction of selection. The select position sensor 8 comprises a potentiometer, and one end portion of a lever 82 is attached to a turning shaft 81 thereof. An engaging pin 83 attached to the other end portion of the lever 82 is engaged with an engaging groove 352 formed in the shift sleeve 35. Therefore, when the shift sleeve 35 moves toward the right or left in FIG. 2, the lever 82 swings on the turning shaft 81, whereby the turning shaft 81 turns and the operation position of the shift sleeve 35 is detected, i.e., the position thereof in the direction of selection is detected. The shift lever 34 can be brought to a desired select position by controlling the voltage and the direction of current fed to the coils 40 and 41 of the select actuator 3 by a controller (not shown), based on a signal from the select position sensor 8.

Further, the gear change device 2 of the illustrated embodiment has a shift stroke position sensor 9 for detecting a turning position of the control shaft 32 mounting the shift sleeve 35 which is integratedly constituted with the shift lever 34, i.e., for detecting the shift stroke position thereof. The shift stroke position sensor 9 comprises a potentiometer, and its turning shaft 91 is coupled to the control shaft 32. When the control shaft 32 turns, therefore, the turning shaft 91 turns and the turning position of the control shaft 32, i.e., the shift stroke position thereof is detected.

In the select actuator 3 of the above illustrated embodiment, the shift sleeve 35 which is a shift lever support member for supporting the shift lever 34 is mounted on the control shaft 32 so as to slide in the axial direction. However, it is also allowable to directly mount the shift lever 34 on the control shaft 32 so as to slide in the axial direction.

In this case, the control shaft 32 is arranged in the casing so as to slide in the axial direction, and works as a shift lever support member for supporting the shift lever.

Next, the shift actuator constituted according to the present invention will be described with reference chiefly to FIG. 5 which is a sectional view along the line B—B in FIG. 1.

Figure 5:
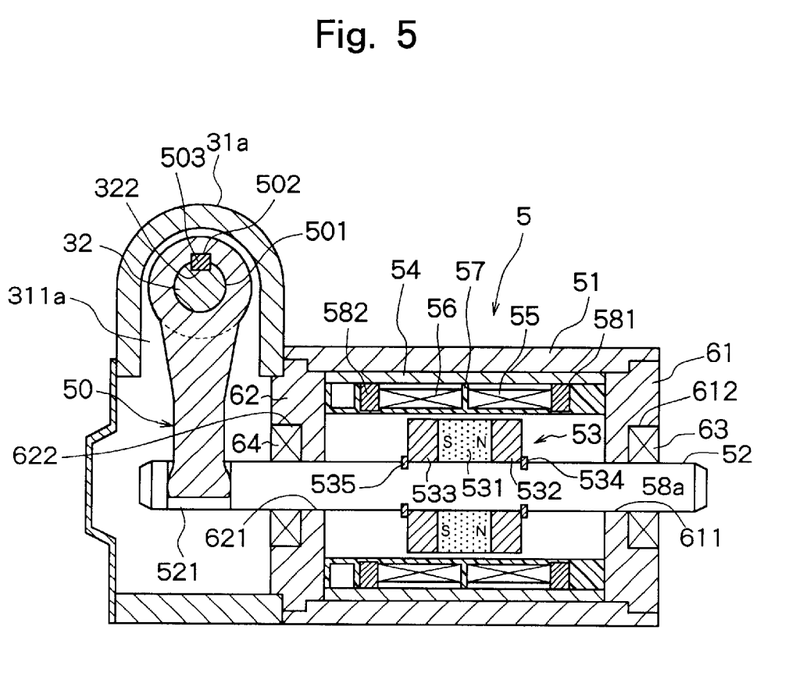
FIG. 5 is a sectional view along the line B—B in FIG. 1.

The shift actuator 5 shown in FIG. 5 has a casing 51, an operation rod 52 that is arranged in the central portion of the casing 51 and engages with the operation lever 50 mounted on the control shaft 32 arranged in the casings 31a, 31b and 31c of the select actuator 3, a magnetic moving means 53 arranged on the outer peripheral surface of the operation rod 52, a cylindrical fixed yoke 54 surrounding the magnetic moving means 53 and arranged inside the casing 51, and a pair of coils 55 and 56 arranged side by side in the axial direction inside the fixed yoke 54. The operation lever 50 that engages with the operation rod 52 has a hole 501 in the base portion thereof to be fitted to the control shaft 32, and turns integratedly with the control shaft 32 by fitting a key 503 into a keyway 502 formed in the inner peripheral surface of the hole 501 and into a keyway 322 formed in the outer peripheral surface of the control shaft 32. The operation lever 50 works as an operation member coupled to the shift lever 34 via the control shaft 32 and the shift sleeve 35, and is arranged passing through an opening 311a formed in the lower portion of the left casing 31a in FIGS. 1 and 2.

The casing 51 in the illustrated embodiment is formed in a cylindrical shape by using a nonmagnetic material such as a stainless steel, an aluminum alloy or the like. The operation rod 52 is constituted by using a nonmagnetic material such as a stainless steel or the like, and has a notch 521 formed in the left end thereof in FIG. 5. An end of the operation lever 50 is brought into engagement with the notch 521.

The magnetic moving means 53 is constituted by an annular permanent magnet 531 mounted on the outer peripheral surface of the operation rod 52 and having magnetic poles in both end surfaces thereof in the axial direction and by a pair of moving yokes 532 and 533 arranged on the outer sides of the permanent magnet 531 in the axial direction. The permanent magnet 531 in the illustrated embodiment is magnetized into the N-pole in the right end surface in FIG. 5 and is magnetized into the S-pole in the left end surface in FIG. 5. The pair of moving yokes 532 and 533 are formed in an annular shape by using a magnetic material. The thus constituted magnetic moving means 53 is positioned by snap rings 534 and 535 mounted on the operation rod 52 on both sides of the magnetic moving means 53, and is limited from moving in the axial direction.

The fixed yoke 54 is formed in a cylindrical shape by using a magnetic material and is mounted on the inner peripheral surface of the casing 51. A pair of coils 55 and 56 are arranged inside the fixed yoke 54. The pair of coils 55 and 56 are wound on a bobbin 57 that is made of a nonmagnetic material such as a synthetic resin or the like and is mounted on the inner periphery of the fixed yoke 54. The pair of coils 55 and 56 are connected to a power source circuit that is not shown. In the illustrated embodiment, magnetic members 581 and 582 are arranged in the bobbin 57 on both sides of the pair of coils 55 and 56. The magnetic members 581 and 582 are formed in an annular shape by using a magnetic material such as iron or the like. The length of the pair of coils 55 and 56 in the axial direction is suitably set depending on the operation stroke of the shift actuator 5.

End walls 61 and 62 are each mounted on both sides of the casing 51. The end walls 61 and 62 are made of a nonmagnetic material such as a stainless steel, an aluminum alloy or a suitable synthetic resin, and have holes 611 and 621 formed in the central portions thereof, so that a shift plunger 52 is inserted therein. The operation rod 52 arranged being inserted in the holes 611 and 621 is supported by the inner peripheral surfaces of the holes 611 and 621 so as to slide in the axial direction. Notches 612 and 622 are formed in the end walls 61 and 62 in the inner peripheral portions on the outer sides thereof. Sealing members 63 and 64 are fitted into the notches 612 and 622.

The shift actuator 5 according to the illustrated embodiment is constituted as described above, and its operation will now be described with reference to FIG. 6.

The shift actuator 5 is constituted as described above, and operates based on the principle of a linear motor constituted by the magnetic moving means 53 arranged on the operation rod 52, the fixed yoke 54 and the pair of coils 55 and 56. The operation will now be described with reference to FIG. 6.

In the shift actuator 5 as shown in FIGS. 6(a) to 6(d), there is established a magnetic circuit 530 passing through the N-pole of the permanent magnet 531, one moving yoke 532, one coil 55, the fixed yoke 54, the other coil 56, the other moving yoke 533, and S-pole of the permanent magnet 531.

Figure 6:
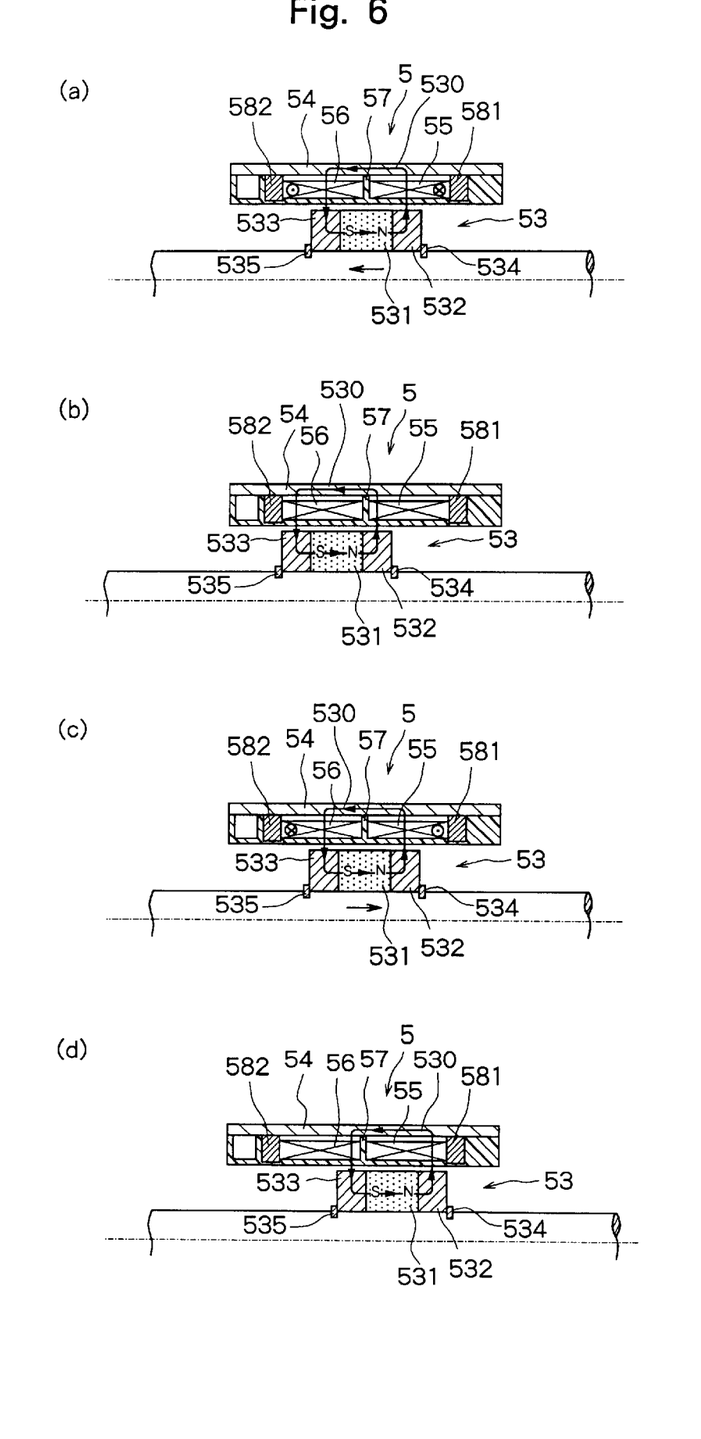
FIG. 6 is an explanatory view illustrating the operation of the shift actuator shown in FIG. 4.

When the electric currents are fed to the pair of coils 55 and 56 in the opposite directions as shown in FIG. 6(a) in a state where the operation position of the operation rod 52 is at the neutral position shown in FIG. 6(a), the magnetic moving means 53, i.e., the operation rod 52 produces a leftward thrust as indicated by an arrow in FIG. 6(a) according to the Fleming's left-hand rule, consequently, the operation rod 52 moves toward the left in FIG. 5, and the control shaft 32 turns clockwise in FIG. 5 via the operation lever 50 which is engaged at its end with the operation rod 52. Accordingly, the shift lever 34 constituted integratedly with the shift sleeve 35 mounted on the control shaft 32 is shifted in one direction. Then, as the magnetic moving means 53, i.e., the operation rod 52 arrives at a position shown in FIG. 6(b), the controller (not shown) so judges that it has operated up to one shift stroke end, i.e., up to the gear-engaging position based on a signal from the shift stroke position sensor 9, and interrupts the flow of current to the pair of coils 55 and 56.

Next, when the electric currents are fed to the pair of coils 55 and 56 in the opposite directions (directions opposite to those of FIG. 6(a)) as shown in FIG. 6(c) in a state where the operation position of the shift plunger 52 is at the neutral position, the magnetic moving means 53, i.e., the operation rod 52 produces a rightward thrust as indicated by an arrow in FIG. 6(c) according to the Fleming's left-hand rule. As a result, the operation rod 52 moves toward the right in FIG. 5, and the control shaft 32 turns counterclockwise in FIG. 5 via the operation lever 50 of which the end portion is engaged with the operation rod 52. Accordingly, the shift lever 34 constituted integratedly with the shift sleeve 35 which is mounted on the control shaft 32 is shifted in the other direction. Then, as the magnetic moving means 53, i.e., the operation rod 52 arrives at a position shown in FIG. 6(d), the controller (not shown) so judges that it has operated up to the other shift stroke end, i.e., up to the gear-engaging position based on a signal from the shift stroke position sensor 9, and interrupts the flow of current to the pair of coils 55 and 56.

Here, the driving force of the shift actuator 5 will be described with reference to FIG. 7.

Figure 7:
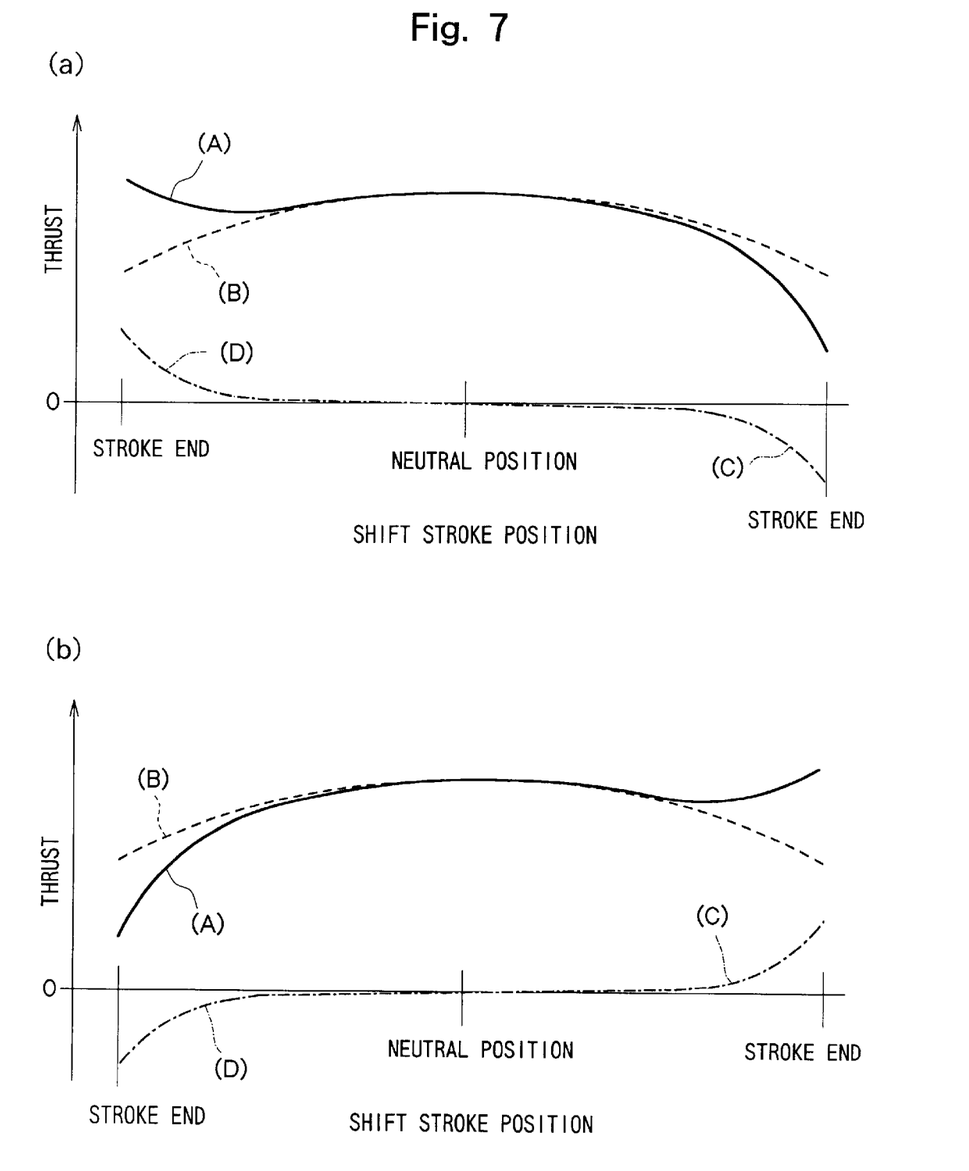
FIG. 7 is explanatory diagrams illustrating the driving force of the shift actuator shown in FIG. 1.

FIG. 7(a) illustrates the driving force of the shift actuator 5 of when the magnetic moving means 53, i.e., the operation rod 52 is operated toward the left, and FIG. 7(b) illustrates the driving force of the shift actuator 5 of when the magnetic moving means 53, i.e., the operation rod 52 is operated toward the right. In FIGS. 7(a) and 7(b), broken lines (B) represent thrust characteristics based on the principle of a linear motor constituted by the magnetic moving means 53, the fixed yoke 54 and the pair of coils 55 and 56, chain lines (C) represent attractive forces between the permanent magnet 531 and the magnetic member 581, chain lines (D) represent attractive forces between the permanent magnet 531 and the magnetic member 382, and solid lines (A) represent driving forces of the select actuator 5 of when an electric current is fed to the pair of coils 55 and 56. That is, the driving force of the shift actuator 5 of when an electric current is fed to the pair of coils 55 and 56 represented by the solid line (A) is a synthesis of the thrust represented by the broken line (B) produced based on the principle of the linear motor constituted by the magnetic moving means 53, the fixed yoke 54 and the pair of coils 55 and 56, and attractive forces represented by the chain lines (C) and (D) between the permanent magnet 531 and the magnetic members 581, 582. In the shift actuator 5 of the illustrated embodiment, the pair of magnetic members 581 and 582 are arranged on both sides of the pair of coils 55 and 56. Even when no current is supplied to the pair of coils 55 and 56, therefore, the attractive forces act between the permanent magnet 531 and the magnetic members 581, 582 as represented by chain lines (C) and (D). The attractive forces increase as the permanent magnet 531 and the moving yokes 532, 533 approach the magnetic members 581 or 582, and become the largest at the shift stroke ends. In moving the magnetic moving means 53, i.e., the operation rod 52 toward the left in FIG. 7(a), the attractive force between the permanent magnet 531 and the magnetic member 581 represented by the chain line (C) works to prevent the motion toward the side of the neutral position side at the gear-engaging position shown in FIG. 6(d), i.e., works as a force to prevent the gear of the transmission from undesirably disengaging, i.e., works as a self-holding function. In moving the magnetic moving means 53, i.e., the operation rod 52 toward the right in FIG. 7(b), on the other hand, the attractive force between the permanent magnet 531 and the magnetic member 582 represented by the chain line (D) works to prevent the motion toward the neutral position side at the gear-engaging position shown in FIG. 6(b), i.e., works as a force to prevent the gear of the transmission from undesirably disengaging, i.e., works as a self-holding function. In general, the shifting mechanism of the transmission is equipped with a detent mechanism for holding a state in which the shift lever has been shifted to the shift stroke end, i.e., the gear-engaged state, in order to prevent the gear from undesirably disengaging. In the illustrated embodiment, the attractive force between the permanent magnet 531 and the magnetic member 581 or 582 works as the detent mechanism near the shift stroke end.

Being constituted as described above, the gear change device according to the present invention exhibits actions and effects as described below.

That is, according to the present invention, the select actuator constituting the gear change device has a casing, a shift lever support member that is arranged in the casing so as to slide in the axial direction and supports the shift lever, a magnetic moving means arranged on the outer periphery of the shift lever support member, a cylindrical fixed yoke arranged surrounding the magnetic moving means, a pair of coils arranged inside the fixed yoke, and a select position-limiting means for limiting the operation position of the shift lever support member according to a thrust produced by the shift lever support member in proportion to the amount of electric power fed to the pair of coils; and further magnetic members are arranged on both sides of the pair of coils. Accordingly, the attractive force acts between the magnetic moving means and the magnetic member near the select stroke end with the consequence that a sufficiently large driving force is produced even near the select stroke end.

What I claim is:

1. A gear change device comprising:
    a select actuator for operating the shift lever of a transmission in the direction of selection; and
    a shift actuator for operating said shift lever in the direction of shift; wherein
        said select actuator has a casing, a shift lever support member that is arranged in said casing so as to slide in the axial direction and supports said shift lever, a magnetic moving means arranged on the outer periphery of said shift lever support member, a cylindrical fixed yoke arranged surrounding said magnetic moving means, a pair of coils arranged inside said fixed yoke, and a select position-limiting means for limiting the operation position of said shift lever support member according to a thrust produced by said shift lever support member in proportion to the amount of electric power fed to said pair of coils; and further, magnetic members are arranged on both sides of said pair of coils for exerting a force on the shift lever support member due to a magnetic force created by the magnetic moving means.

2. A gear change device according to claim 1, wherein said magnetic members are arranged in a bobbin on which said pair of coils are wound.

* * * * *